United States Patent [19]

Lee

[11] Patent Number: 4,955,315

[45] Date of Patent: Sep. 11, 1990

[54] LARGE VEHICLE ENTRANCE DOOR SAFETY SYSTEM AND METHOD

[76] Inventor: James F. Lee, 218-12 43rd Ave., Bayside, N.Y. 11361

[21] Appl. No.: 347,520

[22] Filed: May 4, 1989

[51] Int. Cl.[5] .................... B60T 13/00

[52] U.S. Cl. .................... 116/28 R

[58] Field of Search .................... 116/28 R, 200, 321, 116/322, 323, 303; 49/199, 200; 160/201; 52/105; 40/459, 460, 594, 595; 405/104–106

[56] References Cited

U.S. PATENT DOCUMENTS

| | | | |
|---|---|---|---|
| 575,998 | 1/1897 | Stokes | 405/104 |
| 2,257,484 | 9/1941 | Rowe | 160/201 |
| 2,569,529 | 10/1951 | Kirk | 116/28 R |
| 2,706,462 | 4/1955 | Evans | 116/28 R |
| 3,137,267 | 6/1964 | Hurt | 116/28 R |
| 3,425,387 | 2/1969 | Mitchell | 116/200 |
| 3,493,925 | 2/1970 | Brancale | 116/28 R |
| 4,401,050 | 8/1983 | Britt et al. | 116/205 |
| 4,603,828 | 8/1986 | Farley, Jr. et al. | 248/542 |
| 4,621,252 | 11/1986 | Johns et al. | 340/61 |
| 4,771,505 | 9/1988 | Dilich | 16/86 A |

FOREIGN PATENT DOCUMENTS

| | | | |
|---|---|---|---|
| 3411802 | 10/1985 | Fed. Rep. of Germany | 49/200 |
| 1466408 | 12/1966 | France | 116/28 R |

*Primary Examiner*—William A. Cuchlinski, Jr.
*Assistant Examiner*—W. Morris Worth
*Attorney, Agent, or Firm*—Morgan & Finnegan

[57] ABSTRACT

A large vehicle entry door safety system which uses at least one fixed mark at a measured height and a position indicator attached to the door. By safely and clearly indicating the height of the large vehicle entry door by visual alignment of the position indicator with the fixed mark or marks, vehicle operators or door operators or both can be helped to avoid collisions with the door.

11 Claims, 3 Drawing Sheets

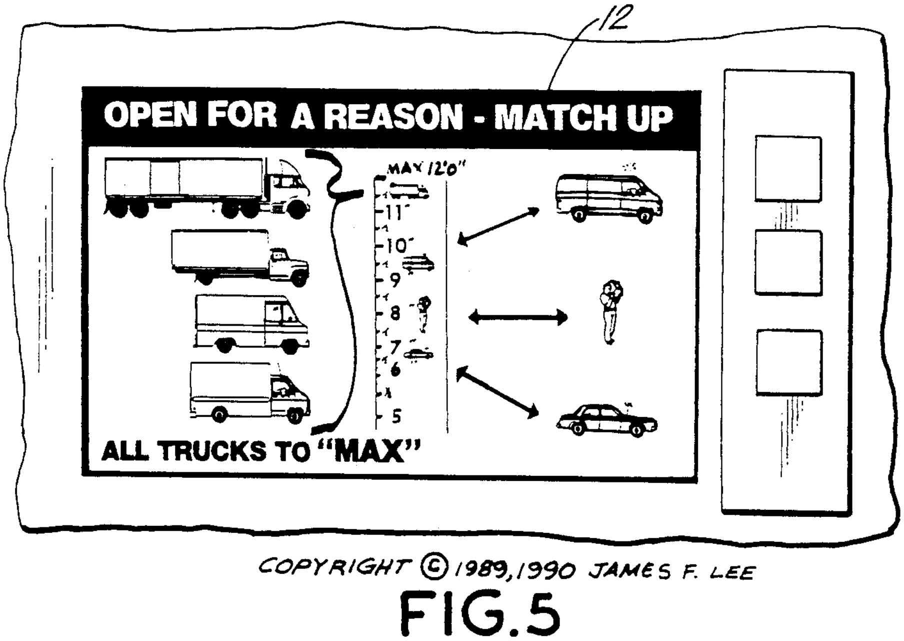
COPYRIGHT © 1989, 1990 JAMES F. LEE
FIG.5
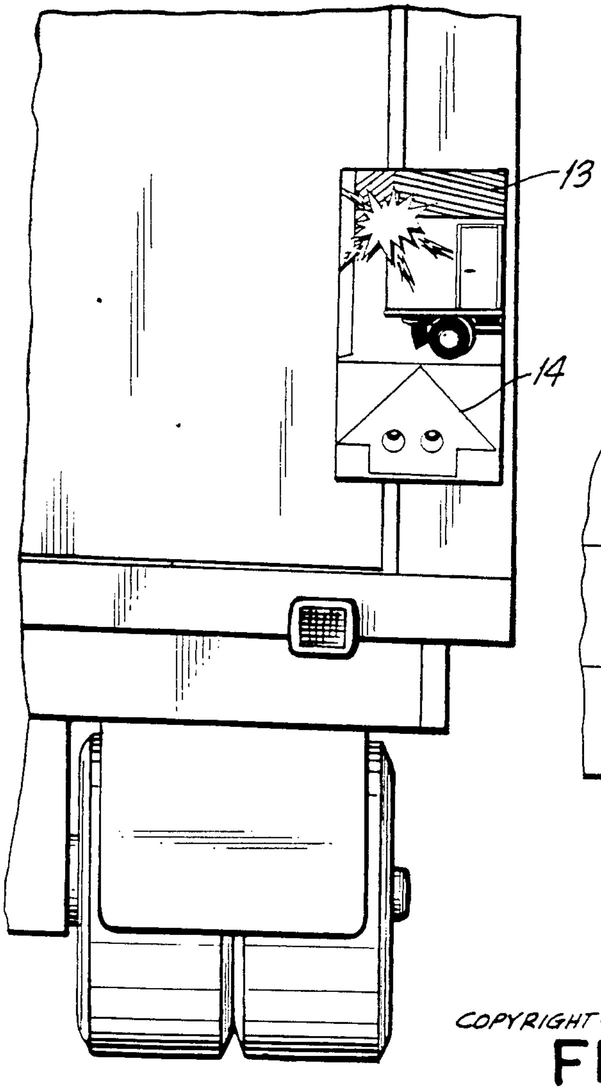
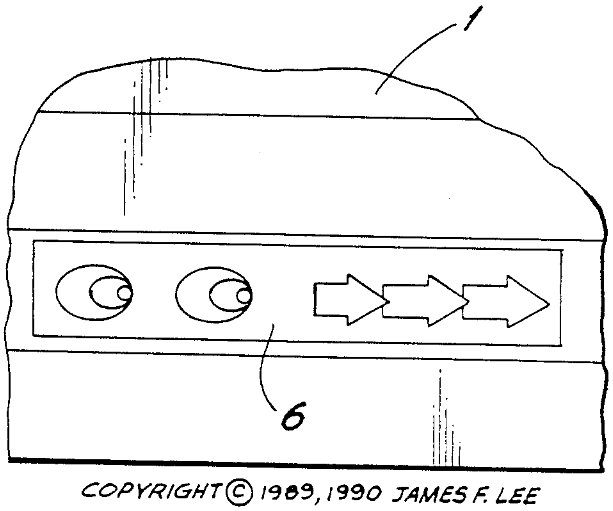
COPYRIGHT © 1989, 1990 JAMES F. LEE
FIG.7
COPYRIGHT © 1989, 1990 JAMES F. LEE
FIG.6

LARGE VEHICLE ENTRANCE DOOR SAFETY SYSTEM AND METHOD

FIELD OF INVENTION

The present invention relates to a vehicle entrance door safety system and method which provides a position indicating means to prevent damage to vehicles and doors as well as injury to persons.

BACKGROUND AND OBJECT OF THE INVENTION

Damage to large vehicle entry doors has long been a problem for fleet operators and building owners. Often, large vehicle entry doors are not positioned in full open or full closed positions. Either to conserve energy or for convenience, doors are adjusted to various heights for differing vehicles as they pass through door openings. As a result, vehicles frequently collide with entry doors causing extensive damage to the door, door frame, vehicle or a combination thereof. Additional problems are encountered when a door or frame is damaged to such an extent as to prevent continued operation. If the door cannot be closed after being damaged, continued energy loss and increased security risks ar confronted. If the door cannot be opened, substantial interference with business traffic and increased safety risks are confronted.

Problems are also encountered when a vehicle is damaged extensively by a door collision. Damage to a truck's container can cause the truck to be removed from service for a substantial time period burdening its owner with repair costs and lost earnings.

Furthermore, personal injury can occur. People, passing through partially opened doors, can misjudge door clearances and incur injury. Such injuries are usually to the head and can be serious.

Damage to the door can occur even when a door is opened to its full height because operators of vehicles are not warned of the clearance available for entry. Additionally, doors might appear to be opened to their full height when in reality they are partially closed.

Two reasons for the problems as defined above are one, there is no way for a vehicle driver to determine the height position of the door opening or the door's maximum clearance and two, door operators are not able to accurately judge a door's opening clearance and are not instructed otherwise.

Existing height measuring systems are employed in other areas but do not address the problems as defined above. For example, various highway bridges usually display clearance heights for truck operators. There, the bridge clearance is fixed. There is no continuous adjustment to height as found with a large vehicle entry door.

In the marine environment, ruled marks are incorporated to indicate water an estimated depth or bridge clearance. There, variable depth or height is encountered but of a different nature. Variation in depth is encountered with the slow accumulation of sludge or other debris on the marine floor. The height variation in the marine environment is due to tidal changes which are slow and predictable. Marine operators who are concerned with depth or height clearances calculate ahead of time and need not be concerned with unknown clearances. That situation is not encountered with large vehicle entry doors. There, door heights are continuously adjusted for various vehicles without any pattern. Operators of doors and vehicles can control the height at which a door is to be adjusted and need to have clearance heights indicated to them at every adjustment.

Various attempts have heretofore been made to provide a satisfactory height indicating means. Early attempts involved attaching poles to the vehicles. An example of such a structure is shown in U.S. Pat. No. 3,137,267 issued to Hurt for a HEIGHT CLEARANCE INDICATOR. That invention involves a complex mechanism to indicate clearance by having a pole act as an antennae. Other related inventions use complex mechanisms to indicate side clearance. Examples of such mechanisms are shown in U.S. Pat. No. 3,493,925 issued to Brancale for a POSITION INDICATING SYSTEM, U.S. Pat. No. 2,706,462 issued to Evans for GARAGE DOOR GUIDES, and U.S. Pat. No. 2,569,529 issued to Kirk for a CLEARANCE INDICATOR.

None of those inventions disclose a simple height indicating system for large vehicle entry doors. It is therefore an object of the present invention to provide a safety system and method of indicating door clearance to door and vehicle operators to avoid entry door damage and risk of personal injury.

It is yet a further object of this invention to define the height of a door opening at all levels.

It is yet a further object of this invention to define safe clearance levels for specific entrance situations such as cars, people, vans or trucks.

It is yet a further object of this invention to inform an individual what a door's maximum height is and whether the door is opened to its maximum height.

It is yet a further object of this invention to allow a door to be positioned to correct heights to avoid unnecessary energy loss.

It is yet a further object of this invention to inform door operators as to the proper height to raise or lower a door.

It is yet a further object of this invention to inform vehicle operators to check door height clearance.

Objects and advantages of the present invention are set forth in part herein and part will be obvious here from, or may be learned in practice with the invention, the same being realized and attained by means of the instrumentalities and combinations pointed out in the appended claims.

The invention consists in the novel parts, constructions, arrangements, combinations, steps and improvements herein shown and described.

SUMMARY OF THE INVENTION

In accordance with the present invention, a safety system and method may be used for allowing an entry door operator or vehicle driver to determine, at a glance, the clearance available when an entry door is partially open or fully open. The invention uses a door and markings measured on an associated door frame or wall as a means to indicate door height. By using measured marks on a door frame or wall as a fixed reference and a door's bottom edge as a position indicating means a person can clearly discern available door clearance.

BRIEF DESCRIPTION OF THE DRAWINGS

The accompanying drawings, referred to herein and constituting part hereof, illustrate preferred embodiments of the product of the present invention and together with the description serve to explain the principles of the invention, in which:

FIG. 5 is a front view of an embodiment of door panel instructions and warning labels.

DETAILED DESCRIPTION OF THE PREFERRED EMBODIMENTS

Figure 1:
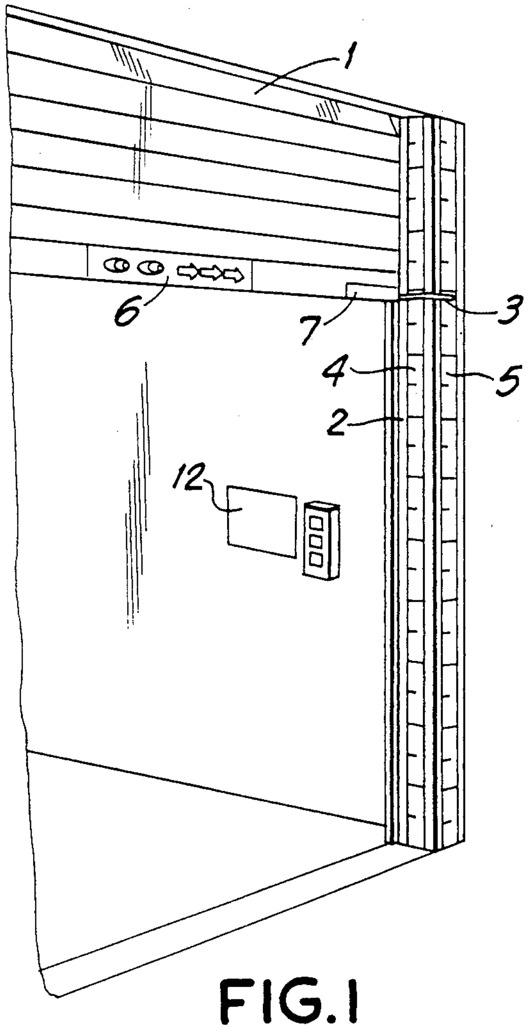
FIG. 1 is a perspective view of one embodiment of the safety system with two ruled edges in place.

Referring now more particularly to FIGS. 1 of the accompanying drawings, there is illustrated a preferred embodiment of a vehicle door safety system in accordance with the present invention. As here embodied, entry door 1 is associated with a door frame 2. Attached to door frame 2 are two sets of ruled markings 4 & 5. Ruled markings can be placed either against door frame 2, as shown with ruled markings 4, or on or near a facing wall, as shown with ruled markings 5. Additionally, a combination of frame and wall markings can be used as shown in FIG. 1.

A position indicating means, 3 or 7, is positioned at or near the door edge. A position indicating means can either be a mark 7 or an attached pointing device 3 or a combination of both as shown in FIG. 1. Pointing device 3, as shown in FIG. 1, is perpendicularly extended from door 1 and associated with ruled markings 4 to indicate door clearance. Additionally, Pointing device 3, as shown in FIG. 1, is bent at a right angle to a position parallel to ruled markings 5 and associated with same to indicate door clearance at a differing angle.

Also shown in FIG. 1 is a warning sign 6 which directs a viewer's attention to check the indicated door clearance.

Figure 2:
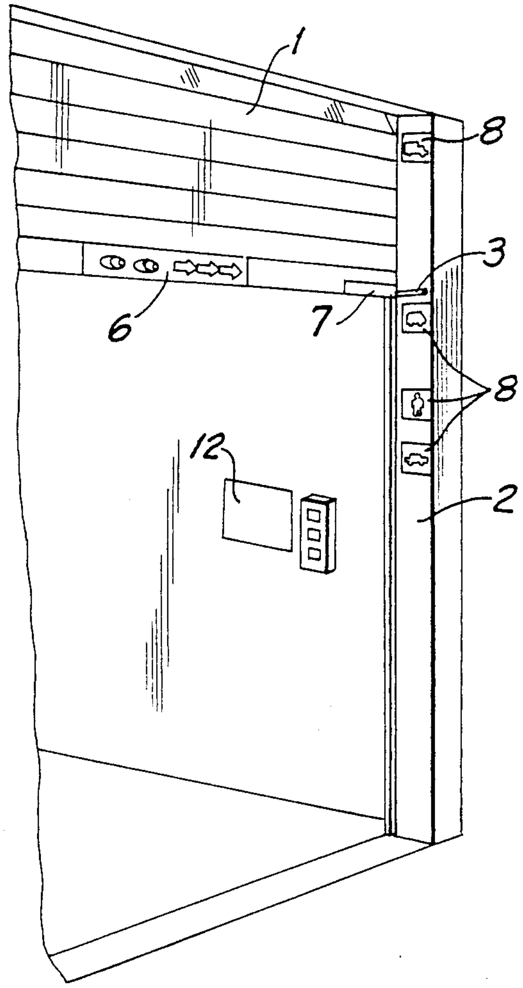
FIG. 2 is a perspective view of another embodiment of the safety system with specific height markings.

Referring now to FIG. 2 of the accompanying drawings, another embodiment of the invention is illustrated. In this embodiment, the ruled markings of FIG. 1 have been replaced with specific vehicle clearance markings 8. Such markings, labeled to indicate a specific vehicle, are placed on the door frame or adjacent wall at various clearance heights for said vehicles. A mark, such as a picture of a car or the word "CAR", is positioned at a height required for oar clearance. Additional markings, for example "PERSON", "VAN" or "DELIVERY TRUCK", are placed at the appropriate height for each vehicle. Position indicating means 3 & 7 are used to indicate whether the door edge is aligned at or above the markings 8. Thus, a door operator, when needing to raise a door to allow a car to enter, can raise door 1 to a proper height by aligning the position indicating means 3 & 7 at or above a car mark 8.

Figure 3:
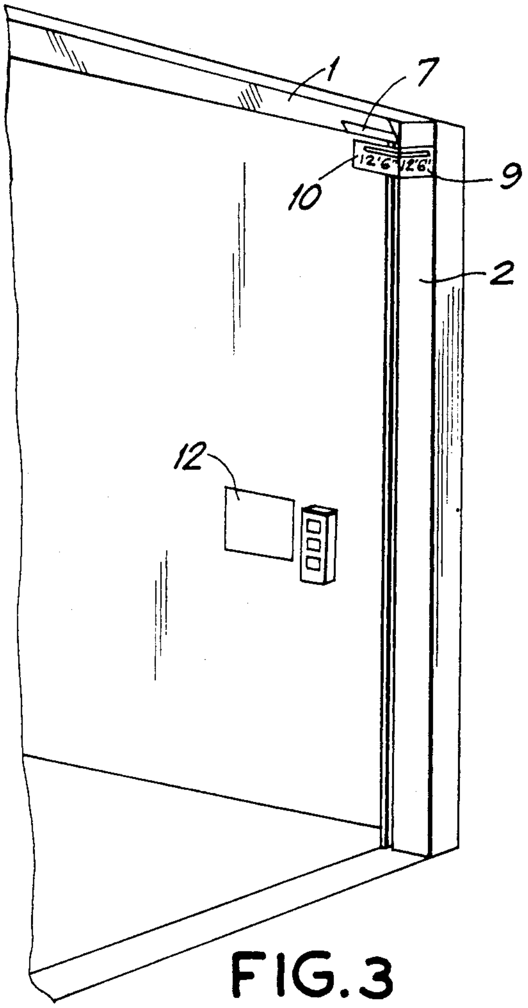
FIG. 3 is a perspective view of another embodiment of the safety system with a single maximum clearance mark.

Referring now to FIG. 3 of the accompanying drawings another embodiment of the invention is illustrated. The embodiment of FIG. 3 is utilized when a door is usually found in a full open position. In such a situation, the need for indicating what a maximum door clearance is and whether a door is opened to said maximum clearance is required.

Mark 10 labeled with the maximum door clearance is attached to door frame 2 behind and parallel to door 1 so that when door 1 is opened to maximum clearance mark 10 becomes visible indicating that the door is opened to maximum clearance. Alternatively or additionally, mark 9, labeled with the maximum door clearance, can be placed against door frame 2 so that when position indicator 7 is aligned or above mark 9 the door is opened to its maximum clearance.

Figure 4:
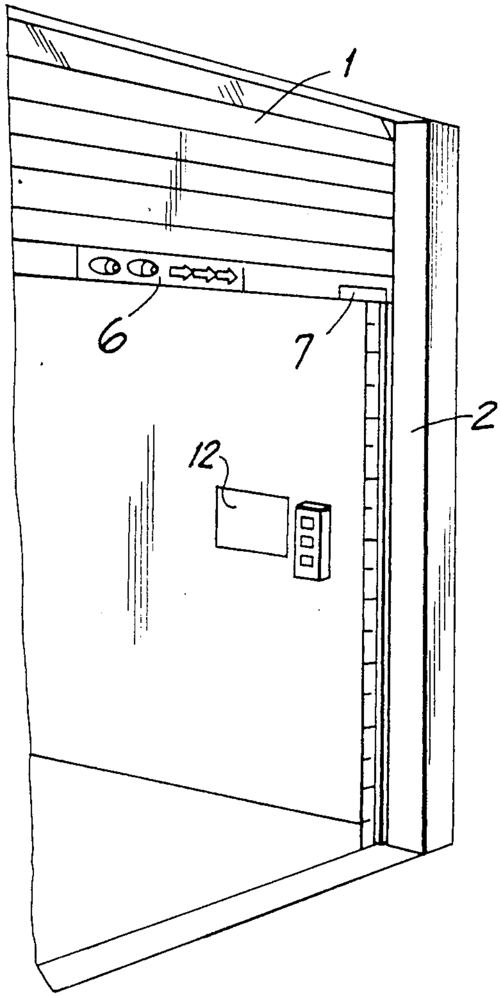
FIG. 4 is a perspective view of another embodiment with ruled markings positioned behind a door.

Referring now to FIG. 4 of the accompanying drawings, another embodiment of the invention is illustrated. Here, ruled markings 11 are placed parallel and behind door 1. As door 1 is opened ruled markings 11 become visible and indicated door clearance. Additionally, a door operator controlling the door 1 from a position inside the door can see the height clearance as indicated by the door edge and inner ruled markings not shown. Alternatively, the ruled markings 11 can function in the same manner when positioned in front of door 1.

Referring now to FIG. 5 of the accompanying drawings, instructions and warning labels are illustrated. Specifically, instructions 12 show a door operator how to use said safety system. Warning sign 13 can be placed on a vehicle to remind drivers and door operators to check the height indicated on the safety system. Also shown is warning signs 6 and 14 which can be placed in various areas to direct attention to the height indicated on the safety system.

What is claimed is:

1. A large vehicle entry door safety system for a vertical sliding entry door having a bottom edge which comprises:

a reference point means at a fixed measured height near said door;

a position indicating means attached to said door for cooperation with said reference point means in indicating the height of said bottom edge by alignment of said indicating means with said reference point means;

said reference point means and indicating means being structured so as to be safely and clearly visible to a vehicle operator or door operator or both to avoid collision with said door.

2. A large vehicle entry door safety system for a vertical sliding entry door having a bottom edge, a door frame, and a wall visible from an outside location which comprises:

at least one mark placed near to the door at a fixed measured height at a location visible with said bottom edge;

a position indicating means attached to said door wherein said indicating means visually aligns with said mark indicating said bottom edge is at said measured height;

said mark and indicating means being structured to be safely and clearly visible to a vehicle operator or door operator or both, to avoid collision with said door.

3. A large vehicle entry door safety system as claimed in claim 2 wherein said mark is a plurality of marks positioned at various fixed measured heights on said door frame.

4. A large vehicle entry door safety system as claimed in claim 2 wherein said mark is a plurality of marks positioned at various fixed measured heights on said wall.

5. A large vehicle entry door safety system as claimed in claim 2 wherein said mark is a plurality of marks at various measured heights and positioned along said door frame substantially parallel to said door so that said marks are only visible to the vehicle operator to an extent that said door is opened.

6. A large vehicle entry door safety system as claimed in claim 2 wherein said mark is at least one symbol representing a vehicle.

7. A large vehicle entry door safety system as claimed in claim 2 wherein said mark is positioned so as to indicate said door's maximum clearance.

8. A large vehicle entry system as claimed in claim 2 wherein said system further comprises a series of visual warning labels positioned on said door or on any vehicle being used with said system or both having means to direct attention to said mark and position indicating means.

9. A large vehicle entry door safety system as claimed in claim 2 wherein said system further comprises a door height controlling means and a series of instructions positioned near said means indicating how to align said indicating means with said mark.

10. A large vehicle entry door safety system for a vertical sliding entry door having a bottom edge, a door frame perpendicular to said door and an outer side wall parallel to said door which comprises:

a plurality of ruled marks positioned on said door frame and on said outer wall;

at least one symbol visually indicating a specific vehicle type positioned at a clearance height associated with said vehicle on said door frame and said side wall;

a position indicating means comprising a rod attached to said door edge and parallel to said door frame and bent at an end so as to be parallel to said side wall and associated with said marks so as to visually indicate by alignment with said marks and symbol said clearance height to a vehicle operator or door operator or both;

a warning mark attached to said door and to any vehicle using said door, said warning mark directing attention to said position indicating means;

a door height control means;

instructions positioned near said door height control means indicating to align said position indicating means with said marks and symbol.

11. A large vehicle entry door safety method comprising the steps of:

positioning ruled marks on a fixed structure near a large vehicle entry door;

providing a visual pointer means on said large vehicle entry door's bottom edge;

associating said pointer means with said ruled markings so as to visually indicate height of said bottom edge to a vehicle operator or door operator or both to avoid collision with said door.

* * * * *

UNITED STATES PATENT AND TRADEMARK OFFICE
CERTIFICATE OF CORRECTION

PATENT NO. : 4,955,315

DATED : September 11, 1990

INVENTOR(S) : Lee

It is certified that error appears in the above-identified patent and that said Letters Patent is hereby corrected as shown below:

Column 3, line 13, after "instructions" delete "and warning labels".

Column 3, line 14, insert -- FIG. 6 is a warning label illustration placed on the rear of a large vehicle. --

Column 3, line 15, insert -- FIG. 7 is a warning label placed on a garage door.--

Column 4, line 16, after "Referring now to" delete "FIG. 5" and insert -- FIGS. 5, 6, and 7 --.

Signed and Sealed this

Sixteenth Day of November, 1993

Attest:

Bruce Lehman

BRUCE LEHMAN

*Attesting Officer* *Commissioner of Patents and Trademarks*